(12) United States Patent
Pierce

(10) Patent No.: US 9,623,371 B1
(45) Date of Patent: Apr. 18, 2017

(54) LOW TEMPERATURE VAPOR PHASE DIGESTION OF GRAPHITE

(71) Applicant: Savannah River Nuclear Solutions, LLC, Aiken, SC (US)

(72) Inventor: Robert A. Pierce, Aiken, SC (US)

(73) Assignee: Savannah River Nuclear Solutions, LLC, Aiken, SC (US)

( * ) Notice: Subject to any disclaimer, the term of this patent is extended or adjusted under 35 U.S.C. 154(b) by 2 days.

(21) Appl. No.: 14/867,644

(22) Filed: Sep. 28, 2015

(51) Int. Cl.
*C23G 1/02* (2006.01)
*B01D 53/62* (2006.01)

(52) U.S. Cl.
CPC ........ *B01D 53/62* (2013.01); *B01D 2251/604* (2013.01); *B01D 2252/20484* (2013.01); *B01D 2258/0216* (2013.01)

(58) Field of Classification Search
CPC .............. B01D 53/62; B01D 2251/604; B01D 2252/20484; B01D 2258/0216
USPC ............................. 134/3; 423/4, 19, 423, 461
See application file for complete search history.

(56) References Cited

U.S. PATENT DOCUMENTS

| | | | |
|---|---|---|---|
| 2,176,348 A | 4/1937 | Juettner | |
| 2,516,233 A * | 7/1950 | Mckinnis | C01B 31/12 423/460 |
| 2,948,627 A | 8/1960 | Field | |
| 3,025,189 A | 3/1962 | Arden | |
| 3,084,076 A | 4/1963 | Loucks et al. | |
| 3,219,408 A | 11/1965 | Bradley et al. | |
| 3,278,278 A | 10/1966 | Flanary et al. | |
| 3,349,597 A | 10/1967 | Gross | |
| 3,410,724 A | 11/1968 | Kondrot | |
| 3,714,323 A | 1/1973 | Dolci et al. | |
| 4,228,141 A * | 10/1980 | Sugikawa | C01B 31/18 423/19 |
| 4,235,279 A * | 11/1980 | Feuchter | B22D 11/045 164/440 |
| 4,389,288 A | 6/1983 | Vaughan | |
| 4,507,267 A * | 3/1985 | Hinssen | G21C 19/38 252/639 |

(Continued)

FOREIGN PATENT DOCUMENTS

| | | |
|---|---|---|
| EP | 2784185 A1 | 10/2014 |
| GB | 997355 A | 7/1965 |
| JP | H03179299 A | 8/1991 |

OTHER PUBLICATIONS

Stanmore et al.; "Oxidation of carbon by $NO_x$, with particular reference to $NO_2$ and $N_2O$," *Fuel*, 2008 (87) pp. 131-146.

(Continued)

*Primary Examiner* — Duy Deo
*Assistant Examiner* — Maki Angadi
(74) *Attorney, Agent, or Firm* — Dority & Manning, P.A.

(57) ABSTRACT

A method for digestion and gasification of graphite for removal from an underlying surface is described. The method can be utilized to remove graphite remnants of a formation process from the formed metal piece in a cleaning process. The method can be particularly beneficial in cleaning castings formed with graphite molding materials. The method can utilize vaporous nitric acid ($HNO_3$) or vaporous $HNO_3$ with air/oxygen to digest the graphite at conditions that can avoid damage to the underlying surface.

19 Claims, 1 Drawing Sheet

(56) References Cited

U.S. PATENT DOCUMENTS

| | | | |
|---|---|---|---|
| 5,108,779 A * | 4/1992 | Gasworth | ............... C30B 25/00 117/89 |
| 5,272,798 A | 12/1993 | Cole et al. | |
| 5,695,734 A | 12/1997 | Ikazaki et al. | |
| 2003/0158057 A1 | 8/2003 | Kim et al. | |
| 2011/0014111 A1 | 1/2011 | Leugers et al. | |

OTHER PUBLICATIONS

Wojtoniszak, et al.; "Controlled oxidation of graphite to grapherne oxide with novel oxidants in a bulk scale," *J. Nanopart Res*, 2012 (14), p. 1248 (7 pages).

Xia et al.; "A highly efficient gas-phase route for the oxygen functionalization of carbon nanotubes based on nitric acid vapor," *Carbon*, 2009 (47) pp. 919-922.

Zarubitskii, et al.; "Interaction of Graphite with Hydroxide-Salt Melts," *Russian Journal of Applied Chemistry*, 2006; pp. 525-528.

Savannah River Nuclear Solutions, LLC; International Patent Application No. PCT/US2016/052998; International Search Report dated Dec. 1, 2016; (2 pages).

\* cited by examiner

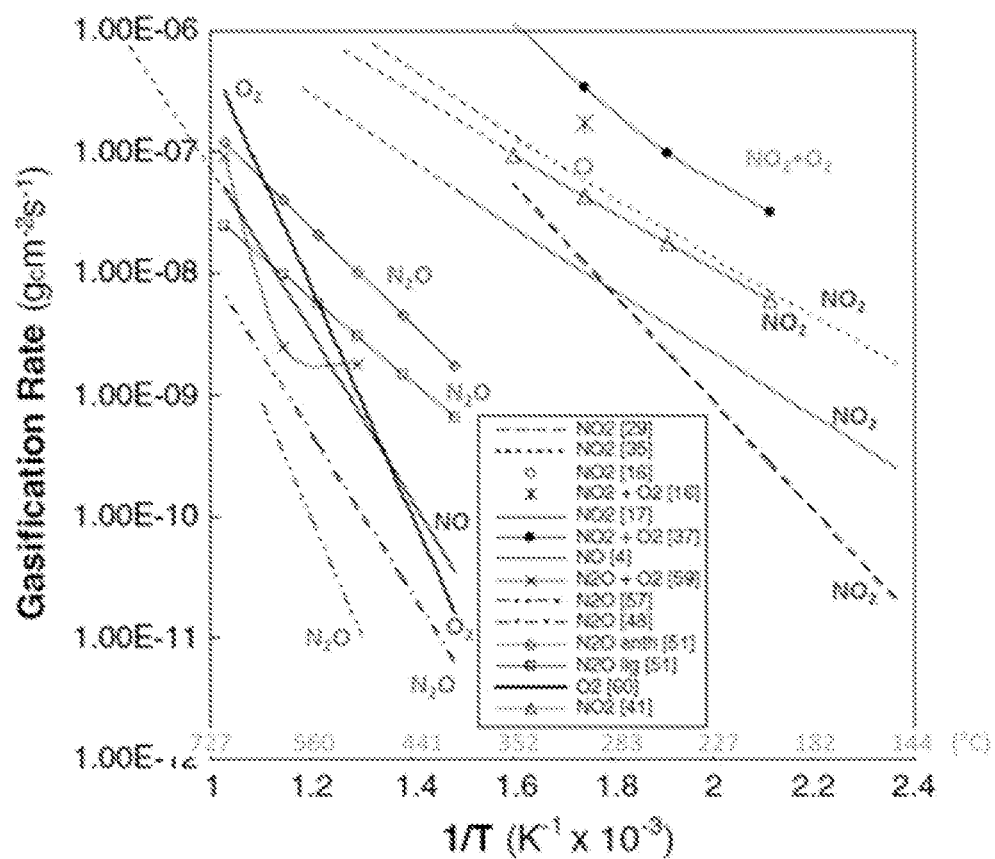

LOW TEMPERATURE VAPOR PHASE DIGESTION OF GRAPHITE

STATEMENT AS TO RIGHTS TO INVENTIONS MADE UNDER FEDERALLY SPONSORED RESEARCH

This invention was made with Government support under Contract No. DE-AC09-08SR22470 awarded by the United States Department of Energy. The Government has certain rights in the invention.

BACKGROUND

As the most stable form of carbon, graphite has found use in a variety of industrial applications. For instance, due to high resistance to erosion and thermal fatigue, graphite has been used for many years in formation of molds for casting of metal parts such as gears, splines, wheels, gear housings, pipe fittings, fuel injection housings, and automotive engine pistons, just to name a few. Graphite molds are commonly used for molding of metals and metal alloys including alloys of aluminum, magnesium, copper, tin, zinc, and lead as well as iron and steel, nickel, cobalt and/or iron based superalloys, stainless steel alloys, titanium alloys and titanium aluminide alloys.

Graphite has also been commonly used in foundry operations as a facing material and as a lubricant. For example, a useful foundry facing mold wash is a water-based paint of amorphous or fine flake graphite. By painting the inside of a mold with the wash and letting it dry, a fine graphite coat can remain on the surface of the mold that can ease separation of the cast structure following formation and cooling. Graphite lubricants are specialty items for use at very high or very low temperatures as a forging die lubricant, an anti-seize agent, and as a gear lubricant for machinery. High film strength graphite lubricants are also utilized during formation of metal wires to prevent metal to metal contact during wire drawing.

In many instances, it becomes necessary to remove graphite from associated materials. For instance, following casting of a metal piece, graphite of the mold or mold facing should be removed in a cleaning process. Similarly, formation processes that utilize graphite lubricants in the formation (e.g., wire drawing) should include removal of the graphite from the piece.

Traditionally, removal of graphite from another material has been carried out by immersion of the piece into a bath of molten salt at elevated temperatures (e.g., about 500° C.) for several hours. Unfortunately, an amount of the graphite often remains adhered to the surface following the bath and this must be removed by physical means such as blasting, chipping, or drilling the debris away by hand. Such removal methods are frequently dangerous and inefficient, particularly in those cases in which the piece has a complicated geometry, such as a cast piece including a hollow internal element formed with a mold core (a solid component of a mold that provides hollow internal elements within a cast metal part), a wire coil, and the like. Even with combination of a molten salt bath and physical removal processes, complete removal of graphite from a piece can often prove difficult.

Molten salt bath cleaning also proves problematic as complete immersion of the piece is necessary and this can prove particularly difficult when considering cleaning of large, irregularly shaped pieces. Moreover, the reactant salt will be consumed during the cleaning process and the carbonate reaction product will build up in the bath as the graphite reaction proceeds, leading to the necessity of refurbishment of the bath at regular intervals. For instance, only about 25% of a sodium nitrate bath can be efficiently utilized before the bath must be reformulated. Thus, large salt waste volumes are generated and the overall process can be very expensive.

What are needed in the art are methods for removing graphite from other materials. For instance, a processing method that can efficiently remove graphite casting materials and graphite lubricants from a formed metal piece and graphite matrix from nuclear fuel particles would be of great benefit.

BRIEF DESCRIPTION OF THE FIGURE

A full and enabling disclosure of the present invention, including the best mode thereof, directed to one of ordinary skill in the art, is set forth in the specification that makes reference to the appended FIG. 1 that illustrates the gasification kinetics for carbon reactions toward various $NO_x$ gases.

SUMMARY

Aspects and advantages of the invention will be set forth in the following description, or may be obvious from the description, or may be learned through practice of the invention.

According to one embodiment, disclosed is a method for removal of graphite from a surface through digestion and gasification of the graphite. The surface can be, for example, the surface of a cast or drawn metal piece and the method can be utilized to clean extraneous graphite, e.g., graphite from a mold or mold facing and/or graphite lubricant, from the surface of the piece following initial formation.

The method can include contacting a structure that includes graphite on a surface thereof with a gaseous stream that includes vaporous nitric acid. According to the method, the nitric acid and/or decomposition products of the nitric acid can react with the graphite upon the contact such that digestion and gasification of the graphite takes place resulting in removal of the graphite from the surface with the underlying substrate remaining. In one embodiment, the digestion process can be carried out at a temperature of about 600° C. or less. The reaction can gassify the graphite and remove essentially all of the graphite from the surface. In one embodiment, the reaction products of the graphite digestion process can include nitrogen ($N_2$) and carbon dioxide ($CO_2$) with little or no carbon monoxide (CO) or other potentially harmful nitrogen-based compounds (e.g., $NO_x$, $N_2O$, etc.) in the off-gases.

DETAILED DESCRIPTION

It is to be understood by one of ordinary skill in the art that the present discussion is a description of exemplary embodiments only, and is not intended as limiting the broader aspects of the present disclosure. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, disclosed herein is a method for removal of graphite from an underlying surface. For instance, the method can be utilized to remove graphite remnants of a formation process from the formed piece in a cleaning process. Any structure that includes graphite at a surface can be treated according to the disclosed processes provided, of course, that the underlying material and structure will not be damaged by the graphite digestion process. In particular, the method can utilize vaporous nitric acid ($HNO_3$) to digest the graphite at conditions that can avoid damage to the underlying surface and piece and remove essentially all (e.g., about 90 wt. % or more, about 95 wt. % or more, or about 99 wt % or more of the graphite) from a surface.

The net reaction for the digestion of graphite with nitric acid is shown in equation (1), below. The heat of reaction $\Delta H$ is calculated as −91.3 kcal/mol C from standard heats of formation at 25° C.

$$4HNO_3 + 5C \rightarrow 2H_2O + 5CO_2 + 2N_2 \tag{1}$$

According to the process, a piece including graphite at a surface can be contacted with an aqueous vapor stream including nitric acid. The feed stream can generally include the nitric acid in a concentration of about 16 moles per liter (M) or less, for instance, from about 10 M to about 16 M or from about 2 M to about 16 M in some embodiments.

While nitric acid utilization appears to increase as a function of $HNO_3$ concentration in the feed stream, the effect is not large. For instance, depending upon temperature, $HNO_3$ utility can increase by an amount of from about 10% to about 30% as the concentration increases from about 4 M to about 16 M. Thus, it is believed that dilution effects caused by oxidant consumption as a gasification process proceeds, particularly in a batch type system, will not greatly impact $HNO_3$ utility. However, it may be beneficial in some embodiments to avoid processing options that can dilute the acid significantly so as to avoid decrease of the overall effectiveness of the process.

As utilized herein, the terms "$HNO_3$ efficiency" and "$HNO_3$ utility" are used interchangeably. These terms are a calculation based on Equation (1), above, which states that 100% $HNO_3$ utility entails 4 mol of $HNO_3$ reacting to convert 5 mol of graphite to $CO_2$, or conversion of 235 g of carbon to $CO_2$ for every liter of 15.7 M $HNO_3$ added. According to the calculation, efficiency values in excess of 100% can be attained if a secondary oxidant is combined with $HNO_3$ to increase the quantity of carbon oxidized per quantity of $HNO_3$ added.

According to one embodiment, nitric acid can be injected into the reaction at more than one stage during a process. However, if decreasing acid concentration decreases oxidant use efficiency, downstream injections can be less efficient due to dilution by upstream gases. The desirability of such processing modifications can depend upon the specific characteristics of the process and the system. The optimization of process characteristics of any particular design are well within the ordinary abilities of one of skill in the art. For instance, in those embodiments in which a lower concentration acid is suitably effective for oxidation of graphite, a process can include capturing and reusing $HNO_3$ and $NO_x$ species from the off gas stream. Recycle acid is frequently of a lower concentration than the starting acid $HNO_3$ and such a recycle stream can be utilized to increase the quantity of carbon oxidized per quantity of $HNO_3$ added in the feed stream.

The effect of $HNO_3$ feed rate is believed to be relatively small on the overall efficiency of the process. However, the acid feed rate can affect the process, for instance if acid is pumped into the reaction vessel at a rate which exceeds its ability to react before exiting the reaction vessel. The acid feed rate can also affect the reaction by increasing the temperature in the reaction due to the exothermic reaction of $HNO_3$ and $NO_x$ products with carbon. In general, however, the feed rate of nitric acid to a process vessel with a nominal 2-inch diameter can generally be about 5 milliliters per minute (mL/min) or less, for instance from about 0.1 mL/min to about 4 mL/min, or from about 1.2 mL/min to about 2 mL/min, in some embodiments. Of course, larger reaction vessels would be able to accommodate large feed rates of $HNO_3$ and $NO_x$ products.

A reaction process can be carried out in a batch-wise, semi-batch, or continuous flow process. In those embodiments in which a piece is contacted with the full amount of the nitric acid reactant (e.g., in a batch-wise reaction scheme), it is believed that the reaction rate will diminish with time as the reaction proceeds until the oxidant is consumed. In addition, due to potential reactivity concerns, it may be desirable to limit and control the operating temperature. Thus, in one embodiment, a semi-batch or continuous process may be utilized in which the nitric acid can be combined with the piece at a controlled rate. A controlled addition of the nitric acid can be used to maximize the reaction rate and prevent excessive reaction and undesired temperature response.

Temperature can impact the process several ways. The most obvious way is the increase of graphite oxidation rate as a function of temperature. However, the increase in temperature may have a negative impact on $HNO_3$ decomposition and $NO/NO_2$ equilibrium. Increasing the temperature also potentially leads to increased level of volatiles into the off-gas system from the part to be treated. Moreover, the temperature should be such that the underlying piece is not damaged at the processing temperature. In general, the gasification reaction can be carried out at a temperature of about 600° C. or less, for instance from about 200° C. to about 600° C., or from about 300° C. to about 500° C. in some embodiments.

The nitric add can generally be combined with the piece in at least a stoichiometric amount based upon the amount of carbon to be digested. For instance, in one embodiment the nitric add can be combined with a piece in an amount of from about 3 grams of nitric add to about 15 grams of nitric add per gram of graphite, or from about 9 grams of nitric add to about 12 grams of nitric add per gram of graphite, in some embodiments. Actual amounts can depend upon the specific process characteristics and specific graphite content of the piece. For instance, in those embodiments in which the nitric acid stream is recycled to the reaction, the overall amount in the feed stream can be lower.

The reaction of $HNO_3$ with graphite according to the presently disclosed processes is understood to pass through a series of intermediate reactions and reaction products including nitrogen dioxide ($NO_2$), nitric oxide (NO), and nitrous oxide ($N_2O$) from reaction and decomposition to eventually form nitrogen gas ($N_2$). According to one embodiment, the graphite digestion process can be controlled so as to produce water, carbon dioxide and nitrogen gas a products with essentially no carbon monoxide or other nitrogen based gases in the product stream. For instance, in one embodiment discussed further herein, a system can include downstream processing such as scrubbers to provide an off-gas that includes essentially no $NO_x$ compounds.

The magnitude of the reaction rates of the various $NO_x$ gases with carbon are illustrated in FIG. 1. As can be seen, the reaction rates are $NO_2 > N_2O \approx NO \approx O_2$. Thus, the graphite gasification process can be carried out under conditions that encourage $NO_2$ formation and subsequent reaction to generate primarily $N_2$ and $CO_2$ as overall reaction products.

Although multiple reactions have been proposed for each $NO_x$ species, the principal reactions that can take place during a process are believed to be as follows:

$$2NO_2 + C \rightarrow 2NO + CO_2 \quad (2)$$

$$2NO + C \rightarrow N_2 + CO_2 \quad (3)$$

$$2N_2O + C \rightarrow 2N_2 + CO_2 \quad (4)$$

$$NO_2 + NO + C \rightarrow N_2O + CO_2 \quad (5)$$

Two other reactions which may be of significance during a process (Equations (6) and (7), below) involve the reaction of $CO_2$ with C to produce CO and the reaction of NO with $O_2$ to produce $NO_2$.

$$CO_2 + C \rightarrow 2CO \quad (6)$$

$$2NO + O_2 \rightarrow 2NO_2 \quad (7)$$

Without wishing to be bound to any particular theory, it is believed that during a graphite gasification process, $O_2$ reacts with carbon to form and increased concentration of $C^*(O)$ at the graphite surface, which reacts with NO more readily than C to eventually form $C^*(ONO_2)$ at the graphite surface. This intermediate then decomposes to produce $NO + CO_2$.

The initial occurrence of $NO_2$ from the $HNO_3$ feed is believed to occur from two primary sources. The first source is the decomposition of $HNO_3$ according to Equation (8), below.

$$2HNO_3 \rightarrow 2NO_2 + H_2O + \frac{1}{2}O_2 \quad (8)$$

In this reaction, the oxidation state of nitrogen is reduced from +5 to +4, which could reduce the overall $HNO_3$ utility. However, if the $O_2$ produced according to Equation (8) reacts with NO according to Equation (7) to form $NO_2$, the negative impact of Equation (8) on oxidation efficiency can be reduced.

Another source of $NO_2$ formation can be from a reaction of $HNO_3$ with graphite according to Equation (9), below, which is analogous to Equation (8).

$$2HNO_3 + C \rightarrow 2NO_2 + H_2O + \frac{1}{2}CO_2 \quad (9)$$

To augment the reaction chemistry of a process, air or oxygen can be injected with the $HNO_3$. For example, according to one embodiment, the process can include an oxygen feed to the reaction in an amount of about 200 mL/min or less, for instance from about 50 mL/min to about 150 mL/min in some embodiments. Equation (6) indicates that the reaction passes through the formation of NO and, to a lesser degree, $N_2O$. Per FIG. 1, the reaction rate of NO and $N_2O$ with carbon can be less than that of $NO_2$. Thus, in those embodiments in which NO can react with $O_2$ according to Equation (7) before reacting according to Equations (3)-(5), the $NO_2$ can be regenerated in situ and the NO can become an intermediate for rapid transfer of $O_2$ onto C. The data in the upper-right corner of FIG. 1 suggests that such a reaction sequence is feasible at temperatures at which the process can take place and where Equation (3) becomes less prominent.

Analysis of the reaction products from graphite digestion when oxygen ($O_2$) was injected with $HNO_3$ has been carried out. At 600° C., $O_2$ was found to not react completely with graphite while in a reaction vessel, but it was completely consumed once $HNO_3$ was added to the system, even at increasing $O_2$ flow rates. The trends for $NO_2$, NO, $N_2O$, and $N_2$ as a function of $O_2$ feed rate were found to be similar to those observed for $HNO_3$ as a function of temperature.

In some embodiments, there can be a near-linear increase in $HNO_3$ utility as a function of $O$—$HNO_3$ mole ratio. While not wishing to be bound to any particular theory, it is believed that $NO_2$ reacts with graphite to form NO, and $O_2$ reacts with NO to re-form $NO_2$ before NO can react significantly with graphite to yield $N_2O$ or $N_2$, which are not converted back to $NO_2$ by reaction with $O_2$.

As stated previously, a process can be utilized to remove graphite from any underlying surface. In one embodiment, the underlying surface can be that of a metal structure. The metal structure can be of any suitable composition such as, without limitation, metals and metal alloys including alloys of aluminum, magnesium, copper, tin, zinc, and lead as well as iron and steel, nickel, cobalt and/or iron based superalloys, stainless steel alloys, titanium alloys and titanium aluminide alloys.

According to one embodiment, the surface can be the surface of a cast metal piece that has been formed in a mold that includes graphite at the formation surface. For instance, the mold can be a graphite mold or can include a graphite facing on the surface.

A cast piece formed in any graphite mold and according to any methodology as is known in the art can be cleaned according to the disclosed methods. As utilized herein the term "mold" generally refers to an assembly forming a receptacle having an empty cavity that can be filled with a molten metal. Typically, such a cavity is defined by an outer mold boundary (a boundary defining a surface perimeter or spatial limit of the mold shape) formed by an outer shell mold, and optionally, by cores that may be placed within the interior of the cavity for additional interior surface contours defined by inner mold boundaries. Shells form the exterior components of the mold cavity. Any remaining empty spaces within the cavity form the shape of a part, having both the inner and outer surfaces once the molten metal solidifies. After molten metal is poured into the assembly of molds and cores, it is left to cool and form a metal part that is subsequently removed from the assembly.

Different portions of the mold may be sacrificial, meaning that the mold is only used once in the casting process and then destroyed after casting the part. Generally, sacrificial components include the inner cores, and sometimes the outer shell molds. Such an example of the outer shells being sacrificed is in investment casting, where the entire shell mold is destroyed. Further contemplated are shells where layers that contact the metal surface are often sacrificed, and then the shell is reconstituted with another new external replacement layer.

Exemplary graphite molds have been described in U.S. Pat. Nos. 3,241,200; 3,243,733; 3,265,574; 3,266,106; 3,296,666 and 3,321,005 all to Lirones and all incorporated herein by reference. U.S. Pat. No. 3,257,692 to Operhall; U.S. Pat. No. 3,485,288 to Zusman et al.; and U.S. Pat. No. 3,389,743 to Morozov et al. disclose carbonaceous mold surfaces utilizing graphite powders and finely divided inorganic powders termed "stuccos" that may be utilized, all of which are incorporated herein by reference. U.S. Pat. No. 6,799,626 to Ray, et al., which is incorporated herein by reference, describes a mold formed with fine-grained isotropic graphite made via isostatic pressing.

A digestion process can be utilized to remove graphite lubricants or facings as may be used in a formation process.

In one embodiment, a process can be utilized to remove graphite lubricants from wires formed according to a wire drawing process. Graphite lubricants utilized to prevent metal to metal contact during wire drawing naturally have good adherence properties and removal of these compounds from surface area of dense cons can be carried out according to disclosed methods.

Dense wire coils that have in the past exhibited problems with complete cleaning prior to furnace annealing can also be beneficially cleaned according to disclosed methods. In the past, cleaning operations for dense coils were frequently performed in spray type washers employing hot alkaline mixtures that were unable to penetrate the internal areas of the coil resulting in retained lubricant residues. Without proper removal, lubricant residues could carbonize at annealing temperatures generating scale that was extremely difficult to remove. Disclosed methodologies using vaporous nitric acid can solve such problems and prevent formation of carbonized scale on wire coils.

Due to the relatively mild chemistry of the digestion reaction, a reaction vessel need not contain excessively corrosive compounds either prior to, during, or following the reactions. As such, the reactor vessel need not face expensive construction issues associated with highly corrosive reaction environments. For instance, the interior of the reactor vessel can be formed of common stainless steels.

A process can also include downstream processing. For instance, in one embodiment, a process can include scrubbers to remove any remaining $NO_x$ gasses, CO gas, or any other undesirable residual compounds.

Any of a variety of treatment mechanisms as have been developed to remove $NO_x$ from streams can be utilized in conjunction with a digestion process. Flue gas treatment technologies as are currently utilized can be broadly classified as dry and wet techniques. Dry techniques are further classified as selective catalytic reduction, selective non-catalytic reduction, adsorption, and electron beam irradiation. For example, in the selective non-catalytic reduction process, ammonia reduces $NO_x$ present in the gas to nitrogen, without the presence of a catalytic substance. The ammonia is then oxidized to nitrogen and water. The selective catalytic reduction process is similar to the selective non-catalytic reduction process, but requires the presence of a catalytic converter during the contact between the gas and ammonia or an ammonia precursor.

One example of a wet technique as may be utilized is discussed in U.S. Pat. No. 5,637,282 to Osborne, at al., the disclosure of which is hereby incorporated by reference. That system involves removing $NO_x$ from a process exhaust stream through scrubbing with an aqueous peroxide solution. U.S. Pat. No. 6,325,983 to Bomber, at al., which is incorporated herein by reference, is another wet technique method that may be utilized. This process includes a plurality of sequential scrubbing assemblies. The scrubbing assemblies each include a reverse osmosis assembly that significantly reduces water consumption for the scrubbing process.

Other downstream processing can include the conversion of carbon monoxide to carbon dioxide and/or the capture of carbon dioxide from the off-gas. For instance, carbon monoxide in the off gas can be converted to carbon dioxide by an oxidizing catalyst. Hopcalite (a mixture of copper and manganese oxide) is commonly used. Hopcalite is inactivated by humidity, however. As such, a drying material can be located upstream of the catalyst to dry the off-gas.

In one embodiment, a process can include carbon dioxide capture. In some embodiments, a process can also include transportation of the captured $CO_2$ to a storage site and deposition at a location where it will not enter the atmosphere, for instance an underground geological formation.

Any known $CO_2$ scrubbing technology can be utilized to concentrate and capture $CO_2$ from the off-gas. By way of example, activated carbon can be used as a carbon dioxide scrubber. According to one such embodiment, the off-gas can be blown through a bed of activated carbon and the carbon dioxide can adsorb onto the activated carbon. Once the bed is saturated it can be regenerated by blowing low carbon dioxide air, such as ambient air, through the bed. This can release the carbon dioxide from the bed in a high concentration stream that can be captured, and the regenerated bed can then be used to scrub again.

Several minerals and mineral-like materials reversibly bind $CO_2$ and can be effectively utilized in a scrubbing process. For instance, one or more oxides can be utilized that can bind the $CO_2$ as carbonate. Oxides as may be utilized can include quicklime (calcium oxide) that can react with the $CO_2$ to form limestone (calcium carbonate), according to a process called carbonate looping. Other suitable minerals include serpentinite, a magnesium silicate hydroxide, and olivine, a magnesium iron silicate. Molecular sieves as are known in the art can also be utilized in this capacity.

According to one embodiment, one or more amines, e.g., monoethanolamine can be utilized. A cold solution of an organic amine can bind $CO_2$, for instance according to the following reaction scheme:

$$CO_2 + 2HOCH_2CH_2NH_2 \leftrightarrow HOCH_2CH_2NH_3^+ + HOCH_2CH_2NH(CO_2^-) \qquad (10)$$

Strong bases such as soda lime, sodium hydroxide, potassium hydroxide, and lithium hydroxide can be utilized to scrub $CO_2$ by chemically reacting with it. For example, sodium hydroxide-based $CO_2$ scrubbing can be carried out. In this embodiment, $CO_2$ is absorbed by an alkaline NaOH solution to produce dissolved sodium carbonate. The absorption reaction is a gas liquid reaction, strongly exothermic, as follows:

$$2NaOH(aq) + CO_2(g) \rightarrow Na_2CO_3(aq) + H_2O \qquad (10)$$

$$Na_2CO_3(aq) + Ca(OH)_2(s) \rightarrow 2NaOH(aq) + CaCO_3(s) \qquad (11)$$

$$\Delta H° = -5.3 \text{ kJ/mol}$$

Subsequently, the calcium carbonate precipitate can be filtered from solution and thermally decomposed to produce gaseous $CO_2$ that can then be collected. The calcination reaction is the only endothermic reaction in the process as shown:

$$CaCO_3(s) \rightarrow CaO(s) + CO_2(g) \qquad (12)$$

$$\Delta H° = +179.2 \text{ kJ/mol}$$

The thermal decomposition of calcite can be performed in a lime kiln fired with oxygen in order to avoid an additional gas separation step. Hydration of the lime (CaO) can then complete the cycle. Lime hydration is an exothermic reaction that can be performed with water or steam. Using water, it is a liquid/solid reaction as follows:

$$CaO(s) + H_2O(l) \rightarrow Ca(OH)_2(s) \qquad (13)$$

$$\Delta H° = -64.5 \text{ kJ/mol}$$

After capture, the $CO_2$ can be transported to suitable storage sites. For instance, and depending on location, this can be done by pipeline, which is generally the cheapest form of transport. Optionally, the $CO_2$ can be first transported to a pipeline by truck, rail, etc.

Various forms of storage have been conceived for permanent storage of captured $CO_2$, all of which are encompassed herein. By way of example, storage forms can include gaseous storage in various deep geological formations (including saline formations and exhausted gas fields), and solid storage by reaction of $CO_2$ with metal oxides to produce stable carbonates. In one embodiment, the captured $CO_2$ can be transported to oil production fields where it can then be injected into older fields to extract oil.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for digestion of graphite comprising feeding a gaseous stream to contact a structure, the structure comprising graphite on a surface of the structure, the gaseous stream comprising vaporous nitric acid, the nitric acid of the gaseous stream contacting the graphite, wherein upon the contact, reaction between the graphite and the nitric acid and/or between the graphite and one or more decomposition products of the nitric acid takes place resulting in digestion and gasification of the graphite and removal of essentially all of the graphite from the surface.

2. The method of claim 1, wherein the reaction takes place at a temperature of about 600° C. or less.

3. The method of claim 1, wherein the reaction takes place at a temperature of from about 300° C. to about 500° C.

4. The method of claim 1, wherein the gaseous stream comprises water vapor.

5. The method of claim 1, wherein the gaseous stream includes the nitric acid in a concentration of about 16 moles per liter or less.

6. The method of claim 1, wherein one or more additional streams containing vaporous nitric acid are fed to contact the structure at different time points during the reaction.

7. The method of claim 1, wherein an off-gas stream from the reaction is recycled and combined with the gaseous stream.

8. The method of claim 1, wherein the method is carried out in a batch-wise, semi-batch, or continuous flow process.

9. The method of claim 1, wherein the gaseous stream is fed such that the nitric acid contacts the graphite at a concentration of from about 3 grams of nitric acid to about 15 grams of nitric acid per gram of graphite.

10. The method of claim 1, further comprising contacting the graphite with oxygen.

11. The method of claim 10, wherein air or oxygen is fed to contact the graphite in conjunction with the gaseous stream.

12. The method of claim 1, wherein the surface comprises a metal.

13. The method of claim 12, wherein the metal comprises aluminum, tin, lead, steel, nickel, cobalt, an iron-based superalloy, a stainless steel alloy, a titanium alloy, or a titanium aluminide alloy.

14. The method of claim 1, wherein the structure is a cast metal piece.

15. The method of claim 14, the cast metal piece having been formed in a graphite mold or a mold comprising a graphite face.

16. The method of claim 1, wherein the structure comprises a metal wire.

17. The method of claim 16, wherein the structure is a wire coil.

18. The method of claim 1, further comprising scrubbing a stream comprising the off-gas products of the reaction.

19. The method of claim 1, further comprising capturing carbon dioxide formed in the reaction.

\* \* \* \* \*